UNITED STATES PATENT OFFICE.

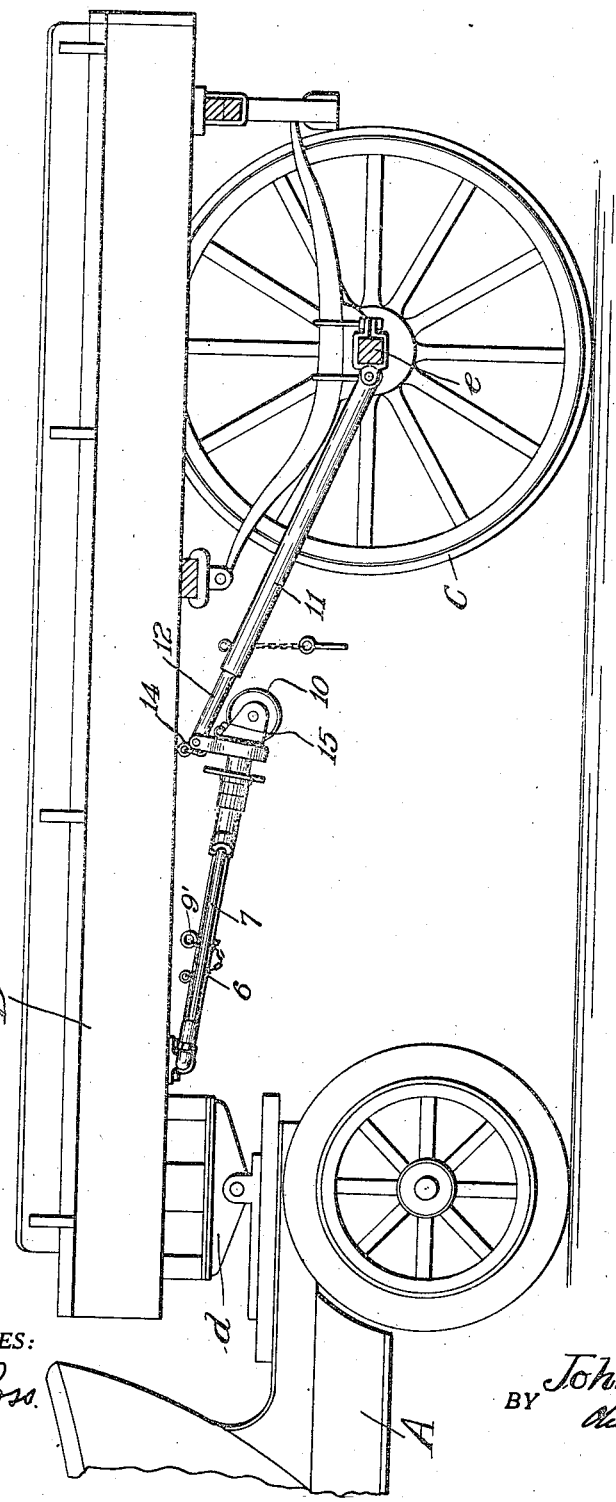

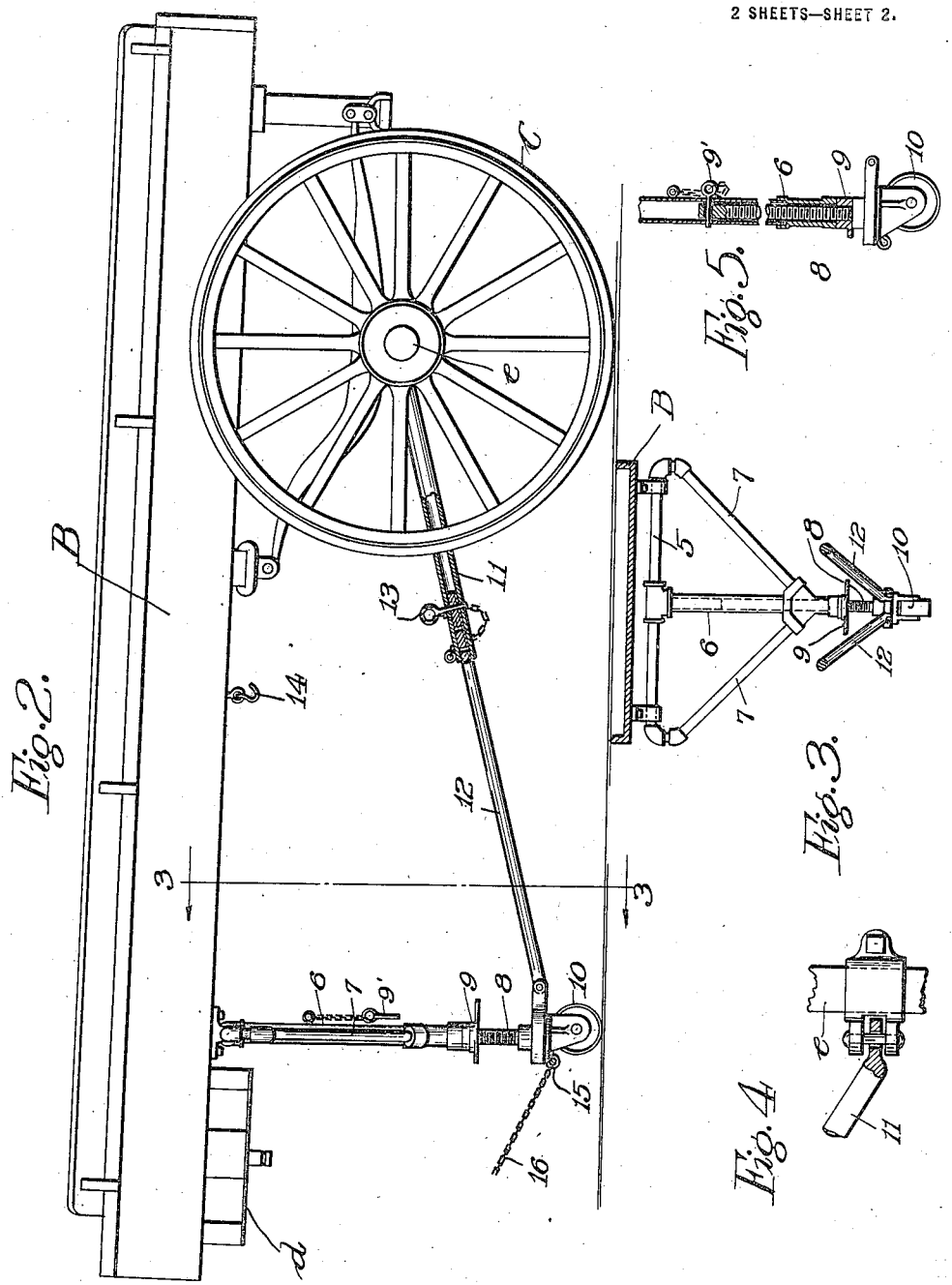

JOHN A. MARTIN, OF INDIANAPOLIS, INDIANA.

TRACTOR-TRAILER ATTACHMENT.

1,259,120.   Specification of Letters Patent.   Patented Mar. 12, 1918.

Application filed April 9, 1917. Serial No. 160,748.

*To all whom it may concern:*

Be it known that I, JOHN A. MARTIN, a citizen of the United States of America, residing at Indianapolis, in the county of Marion and State of Indiana, have invented certain new and useful Improvements in Tractor-Trailer Attachments, of which the following is a specification.

This invention relates generally to the tractor-trailer combination of vehicles and more particularly to improved devices for trailers of the so-called semi-trailer type, which devices are adapted to support the trailer when disconnected from its tractor.

An object of this invention is to provide a combined supporting and jack mechanism for a trailer wagon, which may be moved from an inoperative position, wherein it may be conveniently carried by the trailer, to an operative position, wherein the jack may be operated to lift and thereafter support the trailer, the structure being characterized in that the jack is always available when needed and is secured to the trailer at the proper point for operation.

Another object of this invention is to provide in a trailer of the type described, a third support or wheel at the forward end of the trailer which is normally held away from the ground but which may be moved to lift the trailer from engagement with the tractor and thereafter to support the former, so that the tractor may be used for other purposes during the loading or unloading of the trailer.

Another object of the invention is to provide in a trailer of the type described, a foldable supporting device normally held from engagement with the ground but movable to lift and support the front end of the trailer, the supporting device being preferably arranged for rolling engagement with the ground, so that the trailer may be moved manually, if desired, when disconnected from the tractor.

A further object of the invention is to provide a supporting device for a semi trailer which is of generally simplified and improved mechanical structure as will appear.

Other objects and advantages will appear in the description to follow and will be pointed out in the appended claims.

The invention, in an embodiment at present preferred, is shown for illustrative purposes, in the accompanying drawings, in which—

Figure 1 is a side elevational view with parts broken away of a connected tractor and trailer showing the invention as applied to the trailer;

Fig. 2 is a side elevational view, with parts in section, showing the trailer as disconnected from the tractor and supported by the improved means or devices;

Fig. 3 is a fragmentary cross sectional view taken on the line 3—3 of Fig. 2;

Fig. 4 is a detail view of the connection between the trailer and a part of its supporting device; and Fig. 5 is a sectional elevation illustrative of the jack mechanism.

Referring to these drawings in detail, A represents a tractor of any suitable type and B a trailer wagon. The latter is of the so-called semi-trailer type having merely two supporting wheels C adjacent the rear end thereof. The front end of trailer B overlies the rear end of tractor A and is connected thereto by a fifth wheel device $d$, which has been illustrated merely in conventional form as such devices are now well known in the art. Any suitable type of fifth wheel device may be used as desired and one type, which may be advantageously employed, is illustrated in U. S. Letters Patent No. 1,169,717, granted Charles H. Martin on an invention of H. G. Farr, January 25, 1916. Reference is made to this patent for a complete disclosure of one operable device which is suitable as a connecting means between the tractor and trailer for the present purposes. Further illustration and description of the connection is thought unnecessary and, for the present purposes, it will suffice to state that the connected vehicles A and B are separable at the fifth wheel device and may be disconnected by lifting the front end of trailer B.

The supporting device comprises a braced frame which in the embodiment illustrated is made up from pipe and suitable pipe fittings in the manner clearly shown in Fig. 3. The frame has a horizontal cross piece 5 and depending centrally from the latter is a vertical pipe 6, the lower portion of which is connected by inclined braces 7 to the ends of the cross piece 5. Member 5 is pivotally mounted in suitable spaced brackets secured to the underside of trailer B adjacent the fifth wheel d, and extends transversely across the trailer body. A threaded rod 8 is telescoped within the vertical pipe 6 and threaded on rod 8 is a nut 9 having suitable handles or wings, as shown, for convenient actuation. Rod 8 and nut 9 constitute the jack mechanism and by turning nut 9 pipe 6 may be raised and lowered in an obvious manner. Pipe 6 is normally lowered as shown in Fig. 5 and, when thus positioned, the pipe and rod may be held together by a pin 9' applied through registering holes in the pipe and rod as clearly shown in Fig. 5. Rotatably mounted in a suitable bracket swiveled to the base of rod 8 is a wheel 10, which constitutes the part of the pivoted supporting frame adapted for engagement with the ground.

Pivoted to the rear axle e of the trailer in axially spaced relation thereon are a pair of tubular members 11, one only of which is shown in the drawing. The members 11 are mounted for vertically swinging movement, and each is capable of a limited degree of lateral movement by a suitable connection with axle e, such as the loose pivotal connection clearly shown in Fig. 4. Pivoted to the base of rod 8 are rods 12 which, as shown in Fig. 3, are bent to diverge one from the other. Rods 12 are slidable, as shown in Fig. 2, in the spaced and converging tubular members 11, and, when the parts are positioned as shown in Fig. 2, the rods 12 may be held to the members 11 by pins 13 applied through registering holes in the rods and members. Preferably several spaced holes are provided in rods 12, as indicated in Fig. 2, to permit the members 11 and 12 to be held together in various positions of adjustment.

When pins 13 are removed, the pivoted frame, comprising members 5 to 8, inclusive, may be swung upwardly in a counter clockwise direction to lie in the position shown in Fig. 1 closely adjacent the bottom of the trailer body. A hook 14 or other suitable means is provided to retain the frame in the position shown in Fig. 1. As the described action takes place, the rods 12 telescope within members 11 and the loose pivotal connection of the latter with axle e permits the members 11 to be moved laterally toward one another so that rods 12 may freely slide therein.

The swiveled bracket in which wheel 10 is mounted preferably is provided with an eye 15 to which a suitable chain 16 or the like may be connected, as indicated in Fig. 2.

In operation, the trailer B is hauled to the desired point by tractor A and is then to be disconnected therefrom. The pivoted supporting frame with rod 8 retracted therein and held so retracted by pin 9', is then released from hook 14 and swings downwardly into a position at substantially right angles to the trailer body. As the pivoted frame swings downwardly, rods 12 slide outwardly in members 11, and the pins 13 are then applied to hold the members 11 and 12 together in bracing position for the pivoted frame. Thus, the pivoted supporting frame is effectively held from movement in either direction. The front end of the trailer is then to be lifted a sufficient distance to disengage the mating parts of the fifth wheel device d. Pin 9' is first withdrawn which permits rod 8 to drop until wheel 10 engages the ground. The lifting operation is accomplished by turning nut 9 upwardly on rod 8 to engage and lift the supporting frame in an obvious manner. The rod 8 is held from turning during the elevation of supporting frame by the two rods 12 which engage the base of the rod. The tractor A may then proceed to another point, leaving the trailer supported by the pivoted frame and wheels C. When the trailer is thus supported, it may readily be moved without the tractor. The chain 16 may be applied to the eye 15 as in Fig. 2, and used as a convenient means of manually hauling the trailer, the swiveled wheel 10 permitting easy steering and hauling of the trailer. Since chain 16 is connected to the swiveled bracket for wheel 10, the latter is kept parallel to the line of travel, changing its direction as the direction of pull on chain 16 is varied.

When the trailer B is again to be connected to the tractor A, the latter is merely backed so that the mating parts of fifth wheel on the respective vehicles come into as nearly correct alinement as desired. The exact alinement of these parts may then be readily accomplished by manually moving the trailer on its supporting wheels C and 10. When the two vehicles are correctly positioned with relation to one another, the nut 9 is turned in the opposite direction to lower the supporting frame and permit the mating fifth wheel parts to come into operable engagement. The wheel 10 is then no longer needed for supporting purposes and may be raised in pipe 6. Preferably, the nut is first turned down on rod 8 until it engages the support for wheel 10 and, when so positioned, the holes in pipes 6 and rod 8 just come into registration when rod 8 is lifted to the limit permitted by the engagement of the nut with pipe 6. Pin 9' is then applied to hold pipe 6 and rod 8 together as shown in Fig. 5. The pins 13 are next withdrawn and, thereafter, the frame is swung upwardly and into supporting engagement with hook 14. The trailer is then ready for movement by the tractor.

The invention has been described in a preferred form for illustrative purposes, but the scope of the invention is defined by the appended claims rather than by the foregoing description,

What I claim is—

1. In combination with a trailer having rear supporting wheels and adapted to be supported at its forward end by a tractor for operable hauling, backing, and relatively turning movements, a member pivoted at one end to the trailer near the front end thereof and adapted to swing from an inoperative position to a position substantially at right angles to the trailer body, means to hold the member in each of said positions, and a wheel swiveled in the other end of said member and adapted to be hauled and turned, whereby the trailer may be hauled and turned when disconnected from the tractor.

2. A supporting attachment for a trailer, comprising, a frame constructed in T-form and having diagonal braces connecting the leg of the T to the ends of the cross bar thereof, the latter being adapted for pivotal attachment to the forward end of a trailer, a wheel swiveled in the free end of the leg of said frame, the latter adapted to be moved to lie at right angles to the trailer body for supporting purposes, and means connected in closely adjacent relation to said leg and adapted for connection at laterally spaced points to the trailer near the rear end thereof to hold and brace the frame in supporting position, said frame and means being movable to an inoperative position to be conveniently carried by a trailer.

3. A supporting attachment for a trailer, comprising, a member for pivotal attachment at one end to the forward end of a trailer and adapted to be moved to lie at right angles to the trailer body for supporting purposes, and means connected in closely-adjacent relation to said member near the other end thereof and adapted for connection at laterally-spaced points to the trailer near the rear thereof, to hold and brace said member in trailer supporting position, said member and means being movable to an inoperative position to be conveniently carried by a trailer.

4. A supporting attachment for trailers, comprising, a member for pivotal connection at one end to the forward end of a trailer, a wheel in the other end of said member, said member being movable to bring its wheel into position to support a trailer, and means to hold the member in its supporting position against movement in either direction, said means comprising, a telescopic link connected at one end to said member and adapted for connection at the other end to a part of the trailer, and means to prevent the link from telescoping when said member is in position to support the trailer, all constructed and arranged so that the trailer may be supported and moved as desired when disconnected from its tractor, and means to hold the frame and its wheel away from trailer supporting position, when desired.

5. In combination with a trailer having rear supporting wheels and adapted to be supported at its forward end by a tractor, a member pivoted at one end to the trailer near the front end thereof and adapted to swing from an inoperative position to a position substantially at right angles to the trailer body, means to hold the member in the first-named position, means to hold the member in the last-named position including means to brace the member against both lateral and fore and aft displacement, and a wheel swiveled in the other end of said member, all constructed and arranged so that the trailer may be hauled, backed, and steered when disconnected from its tractor.

6. A frame-work support for pivotal connection to a trailer, comprising in combination, a frame section for pivotal connection to the forward end of a trailer, and a second frame section comprising relatively movable parts adapted for pivotal connection to the rear end of a trailer and to the first-named section, the latter being movable into position to support a trailer, and the second section being movable into position to brace the first section and means to prevent relative movement of said parts when the second frame is in bracing position, said sections being movable to an inoperative position to be conveniently carried by a trailer.

7. A supporting attachment for trailers, comprising in combination, a frame section having a wheel at one end and adapted for pivotal connection at the other end to the forward end of a trailer, a second frame section for pivotal attachment to the rear end of a trailer, said second section comprising relatively movable parts, whereby the first named section is movable to supporting position for a trailer and the second section is movable to bracing position for the first section, and both are movable to an inoperative position to be conveniently carried by a trailer.

8. A supporting attachment for a trailer, comprising in combination, a frame section for pivotal connection at one end to the forward end of a trailer, a second frame section, comprising telescopic links adapted for pivotal connection at one end to the rear end of a trailer and at the other to the first section, said first-named section being movable to supporting position for a trailer and the second frame being movable to bracing position for the first section, and means to prevent said links from telescoping when the second section is in bracing position, said sections being movable to an inoperative position to be conveniently carried by a trailer.

9. A supporting attachment for a trailer comprising in combination, a frame constructed in T-form and having diagonal braces connecting the leg of the T to the ends of the cross bar thereof, the cross bar of said frame being adapted for pivotal attachment to the forward end of a trailer, and a second frame comprising telescopic links pivotally connected at one end to the leg of the first-named frame and adapted for pivotal connection at the other end to laterally spaced points at the rear of a trailer, said first-named section being movable to supporting position for a trailer and the second frame being movable to bracing position for the first section, and means to prevent said links from telescoping when the second section is in bracing position, said sections being movable to an inoperative position to be conveniently carried by a trailer.

10. A supporting attachment for a trailer, comprising in combination, a frame section for pivotal connection at one end to the forward end of a trailer, said section including a member slidable therein, and means to move the latter relatively to the frame, a second frame section comprising members adapted for pivotal connection at laterally spaced points to the rear end of a trailer, other members slidable relatively to the first-named members and pivotally connected in closely adjacent relation to the first-named frame, said first-named section being movable to supporting position for a trailer and the second frame being movable to bracing position for the first section, and means to hold the slidable members to the first-named members in various positions of adjustment when the second section is in bracing position, said sections being movable to an inoperative position to be conveniently carried by a trailer.

11. A lifting and supporting attachment for a trailer, comprising in combination, a jack mechanism for pivotal connection to the forward end of a trailer and a frame section for pivotal attachment to the rear end of a trailer, said section including relatively movable parts, and means to hold said parts against relative movement, when desired, all constructed and arranged so that the mechanism is movable into position for actuation to lift a trailer and the frame section is movable to bracing position for the mechanism and the latter and frame section are movable to an inoperative position to be conveniently carried by a trailer.

12. In combination with a trailer having rear supporting wheels and adapted to be supported at its forward end by a tractor, a member pivoted centrally to the trailer adjacent its forward end for swinging movement, means to hold said member in an inoperative position, said member being movable to lie at right angles to the trailer body to support the latter, a wheel swiveled in the free end of said member, and bracing means to hold said member in trailer supporting position, against lateral and against fore and aft displacement, whereby the trailer may be hauled, backed, and turned when disconnected from its tractor.

13. A supporting attachment for a trailer comprising in combination, a frame constructed in T-form and having diagonal braces connecting the leg of the T to the ends of the cross bar thereof, the cross bar of said frame being adapted for pivotal attachment to the forward end of a trailer, and a second frame comprising relatively movable parts pivotally connected at one end to the leg of the first-named frame and adapted for pivotal connection at the other end to laterally spaced points at the rear of a trailer, said first-named section being movable to supporting position for a trailer and the second frame being movable to bracing position for the first section, and means to prevent relative movement of said parts when the second section is in bracing position, said sections being movable to an inoperative position to be conveniently carried by a trailer.

14. A lifting and supporting attachment for trailers, comprising in combination, a frame section for pivotal connection to the forward end of a trailer, said section including a threaded rod slidable therein, means to removably hold the rod to the frame, and a rotatable member threaded on the rod, and a second frame section for pivotal connection to the rear end of a trailer, said sections being connected for relative movement one to the other, whereby the first section is movable to supporting position for a trailer and the second is movable to bracing position for the first section, all constructed and arranged so that said member after said means are released may be turned on its rod to lift the first frame section, whereby a trailer may be lifted, both said sections being movable to an inoperative position to be conveniently carried by a trailer.

15. A supporting attachment for a trailer, comprising, a member for pivotal attachment at one end to the forward end of a trailer and adapted to be moved to lie at right angles to the trailer body for supporting purposes, a wheel swiveled in the other end of said member, and means connected in closely-adjacent relation to said member near the other end thereof and adapted for connection at laterally-spaced points to the trailer near the rear thereof, to hold and brace said member in trailer supporting position, said member and means being movable to an inoperative position to be conveniently carried by a trailer.

16. In combination with a trailer having rear supporting wheels and adapted to be supported at its forward end by a tractor for operable hauling, backing, and relatively turning movements, a member pivoted at one end to the trailer near the front end thereof for vertical swinging movement, a wheel swiveled in the other end of said member, said member adapted to be moved to bring said wheel into engagement with the ground to support the trailer independently of the tractor, and means to hold the member in trailer supporting position, said wheel being provided with means to receive a draft device, whereby the trailer may be hauled and turned when disconnected from the tractor and said wheel may be maintained parallel to the line of travel of the latter.

17. A lifting and supporting attachment for tractors, comprising in combination, a frame section for pivotal connection at one end to the forward end of a trailer, a threaded rod slidable in the other end of said section, a nut threaded on the rod to engage and lift the latter, telescopic links connected to said rod at one end and adapted for pivotal connection at the other end to the rear end of a trailer, said frame section being movable to supporting position for a trailer and said links being movable to bracing position for the frame section, and means to hold said telescopic links in bracing position, all constructed and arranged so that said nut may be turned on the rod to lift said frame and so that the rod is held from turning by the connection of said telescopic links therewith, whereby a trailer may be lifted, both of said sections being movable to an inoperative position to be conveniently carried by a trailer.

JOHN A. MARTIN